May 26, 1970        L. R. O'HARE        3,514,645
MAGNETOHYDRODYNAMIC TURBINE
Filed May 24, 1968
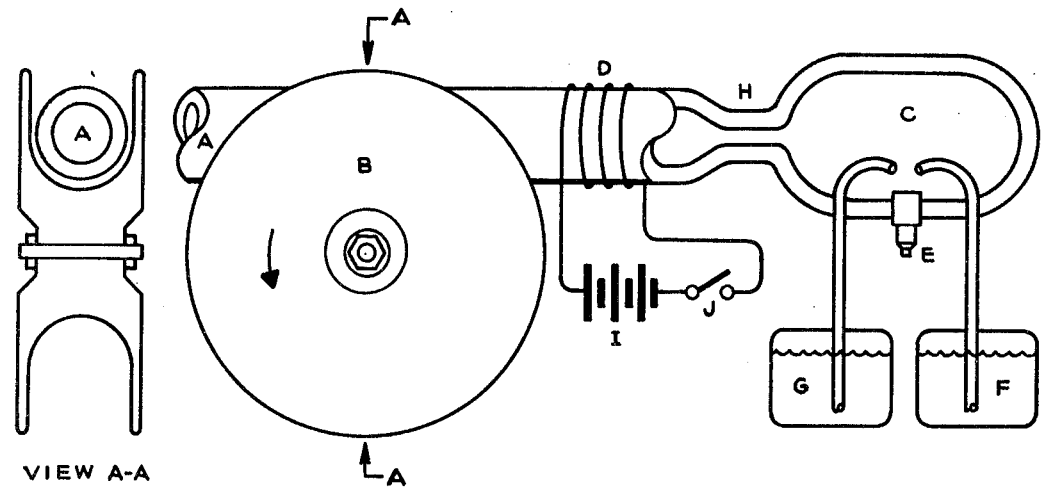
FIGURE I
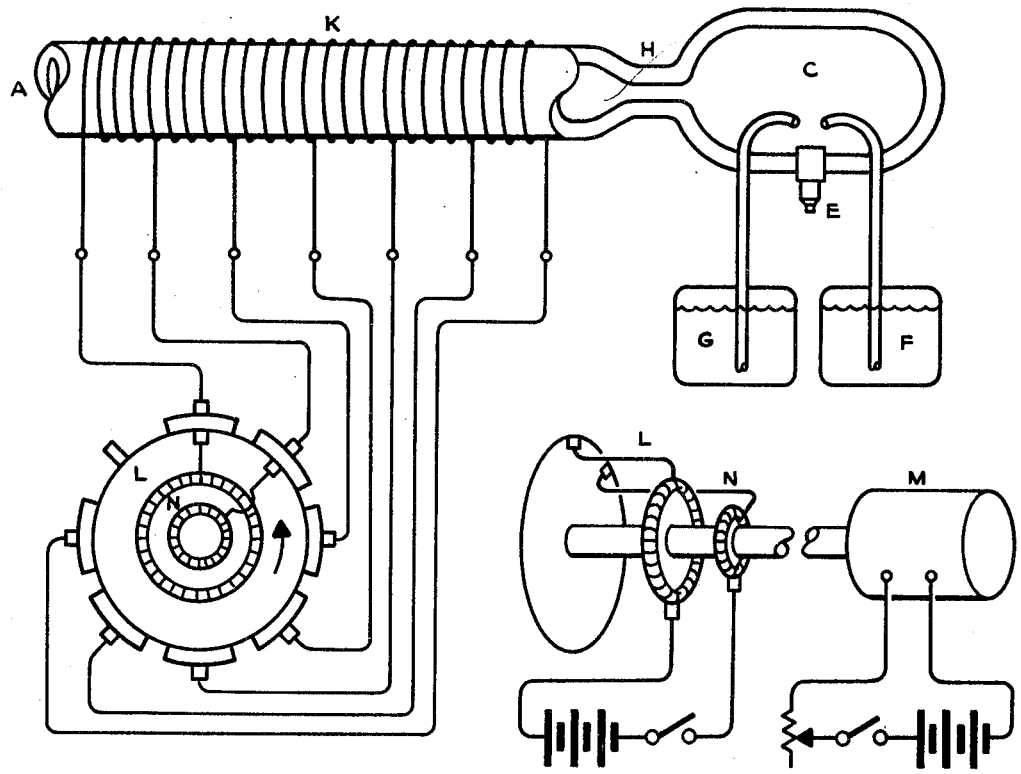
FIGURE II
INVENTOR.
Louis R. O'Hare 3,514,645
MAGNETOHYDRODYNAMIC TURBINE
Louis Richard O'Hare, 2700 Indiana NE.,
Albuquerque, N. Mex. 87110
Filed May 24, 1968, Ser. No. 732,803
Int. Cl. H02n 4/00
U.S. Cl. 310—11                    2 Claims

ABSTRACT OF THE DISCLOSURE

A movable conductive member is supported adjacent to a duct and means provided to pass hot conductive gases through the latter. A winding encircling the duct is arranged to be periodically energized to produce transverse annular currents in the gas by MHD action in order that the resulting moving magnetic fields can impart movement to said conductive member by inducing eddy currents therein.

The engine I have invented for producing rotary power from burning fuels makes use of the principles of a gas turbine and the principles of an electric motor. In my invention there are no electrodes and the hot gases are contained entirely within non corrosive ceramic. The gases make no physical nor abrasive contact with the impeller blades but by means of electrical and magnetic fields within electrically conductive gas induce motion from the streaming gas into rotating electrically-conductive discs. My invention employs a method of raising the magnetic fields to great intensity for greater transfer of energy of combustion into rotary motion.

FIG. I shows an MHD type of drive for a pulley in which a coil upstream of the pulley is provided with means for periodic energization.

FIG. II shows a modification in which sections of a coil to be located adjacent a conductive pulley (not shown) are arranged for successive energization.

On the drawing FIG. II, parts D, I, J of FIG. I are replaced by coil K, rotary switch L, slip rings N, and adjustable speed motor M. As rotary switch L rotates counterclockwise current is carried through slip rings N and rotary switch L to first coil segment of coil K on its far right; as rotary switch continues to rotate the second segment receives current and the first segment on the far right is switched off. The sequence progresses successively until finally the segment of coil K on the far left is energised. This produces the effect of a coil magnet moving from right to left along tube A. Each of these magnets is strengthened by the streaming electrically conductive gas when the radial lines of force are broken to produce circular electric current which in turn produces more magnetic lines of force. When tube A, with coil K is inserted in pulley shaped wheel B, control is obtained over the speed with which the motion inducing magnets move through the tube. Motor M is a variable speed motor.

THE DESCRIPTION

It is a magnetohydrodynamic turbine which operates without electrodes using for fuel any number of hydrocarbons with air or nitrogen fuels, to which fuels are added easily ionizable salts of the alkali-earth metals. When the fuels with the ionizable material is ignited in the combustion chamber a stream of electrically-conductive hot gas is expelled at high speed and pressure into a ceramic tube. The stream of electrically conductive gas or vapor moving through the tube moves across radial magnetic lines of force. These lines of force are caused in the tube by a coil of insulated electrical wire wound axially around the tube and connected to a source of electrical current.

When this stream of gas or conductive vapor breaks these lines of force a circular electric current flowing around the axis is generated in the conductive gas. This current acts to increase the magnetic lines of force caused by the current flowing in the external windings of the coil. The total effect is to produce a strong magnetic field which would be analogous to a strong bar magnet inserted in a ceramic tube lengthwise. When the current in the external windings of the coil is removed, the hot conductive gas with its circular electric current and radial magnetic field is propelled down the tube by the force of the same streaming gas. The strong magnetic field moving down the tube can be coupled to a conductive disc in the same way in which a rotating magnet placed in front of a copper disc produces motion in the disc in the famous electric tongue converter. Hence the ceramic tube is inserted in the slot of a deep pulley-shaped metal wheel. The magnetic field of each portion of the gas stream induces electric current in the conductive plates of the pulley-shaped impeller. These induced electrical currents have magnet fields which couple or form the energy motion of the moving gas to the discs of the impeller and cause it to rotate. For a sustained succession of magnetic fields to be moving through the tube it is necessary to constantly interrupt the current in the external winding.

The streaming gas with its circular current of electricity and its radial magnetic lines of force can be used to produce rotary motion also by inserting the cylindrical ceramic tube in an electrically conductive tube in which a spiral cut has been made down the entire length of the conductive tube. By analogy if a bar magnet were propelled down the length of this tube the induced electric currents and corresponding magnetic fields would cause the magnet to rotate on its own lengthwise axis as its fields followed the conductive surface of the tube. If then the bar magnet were impeded from rotating the cylinder or tube would rotate. When the gas with the circular current and the radial lines of force (which correspond to a magnet moving along through the tube lengthwise), is impeded from rotating as a bar magnet on its axis then its quality as a magnet will induce circular or rotary motion in the conductive tube with the spiral cut. The manner of preventing the gas magnets from rotating is to have strong longitudinal magnetic lines of force extending down the length of the tube.

I claim:

1. A device for the production of motive power in which useful energy is extracted from the kinetic energy of an electrically conductive streaming fluid which energy is imparted to the fluid by means of heat application to the fluid material confined in a pressure chamber and released through a nozzle, whereupon this fluid moving through a cylindrical tube transverses radial magnetic lines of force extending radially into the cylindrical tube thereby producing annular electrical current within said conductive fluid, an exciter coil circling the tube to produce said lines of force and a movable member of conductive material adjacent the coil, said annular current in turn producing more radial lines of magnetic force which groups of magnetic lines of force are caused to travel laterally down the length of the tube by sequentially energizing the exciter coils producing a distinct traveling wave greatly energized by interaction of the streaming fluid with the radial magnetic lines of force in the wave and the reaction of this strengthened wave with the adjacent electrically conductive material by means of induced eddy currents in said material which currents causing magnetic physical forces to couple said material to the motion of the moving fluid and thereby imparting the streaming energy of the fluid into the adjacent conductor for useful work movement of the conductor.

2. A device for the production of rotary power in which useful power is extracted from the kinetic energy of an electrically conductive streaming fluid which energy is imparted to the fluid by means of heat application to the fluid material confined in a pressure chamber and released through a nozzle whereupon this fluid moving through a cylindrical tube transverses radial magnetic lines of force extending radially into the cylindrical tube thereby producing annular electrical current within said conductive fluid, exciter coils circling the tube to produce said lines of force and an electrically conductive impeller wheel adjacent the coil, said annular current in turn producing more radial lines of magnetic force which groups of magnetic lines of force are caused to travel laterally down the length of the tube by sequentially energizing said exciter coils thereby producing a distinct traveling wave greatly energized by interaction of the streaming fluid with the radial magnetic lines of force in the wave and the reaction of this strengthened wave with said electrically conductive impeller wheel by means of induced eddy currents along the tangent of this wheel, said currents causing physical forces to turn the wheel by magnetically coupling the material of the wheel to the moving fluid which is streaming along a tangent of its outer circumferences.

References Cited

UNITED STATES PATENTS

| | | | |
|---|---|---|---|
| 282,165 | 7/1883 | Cheever | 310—14 |
| 2,722,097 | 11/1955 | Lefrand | 310—166 X |
| 2,850,652 | 9/1958 | Stanton | 310—11 |
| 3,189,768 | 6/1965 | Brill | 310—11 |
| 3,285,179 | 11/1966 | Resler | 103—1 |

DAVID X. SLINEY, Primary Examiner

U.S. Cl. X.R.

310—105, 166